(12) United States Patent
Herring et al.

(10) Patent No.: US 7,539,772 B2
(45) Date of Patent: *May 26, 2009

(54) METHOD FOR FACILITATING FORWARDING OF DATA PACKETS THROUGH A NODE OF A DATA TRANSFER NETWORK USING MULTIPLE TYPES OF FORWARDING TABLES

(75) Inventors: Jay R. Herring, Poughkeepsie, NY (US); Scot H. Rider, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/841,163

(22) Filed: Aug. 20, 2007

(65) Prior Publication Data
US 2007/0280248 A1 Dec. 6, 2007

Related U.S. Application Data

(63) Continuation of application No. 10/737,989, filed on Dec. 17, 2003, now Pat. No. 7,308,505.

(51) Int. Cl.
*G06F 15/173* (2006.01)
(52) U.S. Cl. ............... 709/238; 709/245; 370/351; 370/395.31
(58) Field of Classification Search ......... 709/238–242, 709/245, 219; 370/351, 395.31
See application file for complete search history.

(56) References Cited

U.S. PATENT DOCUMENTS

| 5,440,547 A | 8/1995 | Easki et al. |
| 5,490,258 A | 2/1996 | Fenner |
| 5,740,164 A | 4/1998 | Liron |

(Continued)

FOREIGN PATENT DOCUMENTS

EP 1 168 710 A2 1/2002

OTHER PUBLICATIONS

G.S. Kuo et al., "A New Architectural Concept of Hierarchial Routing Scheme for IPv6 in Future High-Speed Large Global Internet", Telecommunications Symposium, IEEE International, vol. 2, pp. 683-643.

(Continued)

*Primary Examiner*—Philip B Tran
(74) *Attorney, Agent, or Firm*—Joseph Biela, Esq.; Kevin P. Radigan, Esq.; Heslin Rothenberg Farley & Mesiti P.C.

(57) ABSTRACT

A method is provided for reducing size of memory required for a switching node's forwarding table by employing forwarding tables of different types to map received data packets addressed to downstream nodes and upstream nodes to appropriate output ports of the switching node. The method includes receiving a data packet at a data transfer node of a network and selecting a forwarding table from multiple types of forwarding tables accessible by the node based on an attribute associated with the received data packet, and mapping the data packet to an output port of the node utilizing the forwarding table selected from the multiple types of forwarding tables based on the attribute associated with the packet.

8 Claims, 3 Drawing Sheets

U.S. PATENT DOCUMENTS

| | | | |
|---|---|---|---|
| 5,740,171 | A | 4/1998 | Mazzola et al. |
| 5,774,642 | A | 6/1998 | Flon et al. |
| 5,802,054 | A | 9/1998 | Bellenger |
| 5,940,597 | A | 8/1999 | Chung |
| 5,948,069 | A | 9/1999 | Kitai et al. |
| 5,949,786 | A | 9/1999 | Bellenger |
| 6,141,738 | A | 10/2000 | Munter et al. |
| 6,173,384 | B1* | 1/2001 | Weaver ............ 370/392 |
| 6,192,051 | B1 | 2/2001 | Lipman et al. |
| 6,256,306 | B1 | 7/2001 | Bellenger |
| 6,275,861 | B1 | 8/2001 | Chaundri et al. |
| 6,307,855 | B1* | 10/2001 | Hariguchi ............ 370/392 |
| 6,308,218 | B1* | 10/2001 | Vasa ............ 709/238 |
| 6,457,058 | B1 | 9/2002 | Ullum et al. |
| 6,553,000 | B1 | 4/2003 | Ganesh et al. |
| 6,584,075 | B1 | 6/2003 | Gupta et al. |
| 6,658,482 | B1 | 12/2003 | Chen et al. |
| 6,697,363 | B1 | 2/2004 | Carr |
| 6,957,312 | B1 | 10/2005 | Chou et al. |
| 6,988,150 | B2 | 1/2006 | Matters et al. |
| 7,085,235 | B2* | 8/2006 | Pin et al. ............ 370/392 |
| 7,111,101 | B1 | 9/2006 | Bourke et al. |
| 7,116,640 | B2 | 10/2006 | Tasman et al. |
| 7,143,196 | B2 | 11/2006 | Rimmer et al. |
| 7,308,505 | B2* | 12/2007 | Herring et al. ............ 709/238 |
| 7,328,284 | B2* | 2/2008 | Rimmer ............ 709/250 |
| 2001/0032201 | A1 | 10/2001 | Lee et al. |
| 2002/0009079 | A1 | 1/2002 | Jungck et al. |
| 2002/0009081 | A1 | 1/2002 | Sampath et al. |
| 2002/0012345 | A1 | 1/2002 | Kalkunte et al. |
| 2002/0012585 | A1 | 1/2002 | Kalkunte et al. |
| 2002/0080755 | A1 | 6/2002 | Tasman et al. |
| 2002/0080798 | A1 | 6/2002 | Hariguchi et al. |
| 2002/0146008 | A1 | 10/2002 | Kaplan |
| 2003/0033427 | A1 | 2/2003 | Brahmaroutu |
| 2003/0051043 | A1 | 3/2003 | Wyschogrod et al. |
| 2003/0112809 | A1 | 6/2003 | Bharali et al. |
| 2003/0191857 | A1 | 10/2003 | Terrell et al. |
| 2004/0030763 | A1* | 2/2004 | Manter et al. ............ 709/223 |
| 2004/0093424 | A1 | 5/2004 | Kojima |
| 2004/0165597 | A1 | 8/2004 | Bicknell et al. |
| 2004/0202184 | A1 | 10/2004 | Yazaki et al. |
| 2004/0255045 | A1 | 12/2004 | Lim et al. |
| 2004/0260833 | A1 | 12/2004 | Rachlin |
| 2005/0038907 | A1 | 2/2005 | Roeder et al. |
| 2005/0071709 | A1* | 3/2005 | Rosenstock et al. ............ 714/5 |
| 2006/0059196 | A1 | 3/2006 | Sato et al. |

OTHER PUBLICATIONS

M. Ruiz-Sanchez et al., "Survey and Taxonomy of IP Adress Lookup Algorithms", IEEE, Inc., vol. 15, No. 2, pp. 8-23, Mar. 2001.

J. Aweya, "One the Design of IP Routers Part 1: Router Architectures", Journal of Systems Architecture, vol. 46, No. 6, pp. 483-511, Apr. 2000.

InfiniBand Architecture Release 1.0, vol. 1 -Genera Specifications "Chapter 18: Switches", pp. 813-829 Oct. 24, 2000.

InfiniBand Architecture Release 1.0, vol. 1 -Genera Specifications "Chapter 19: Routers", p. 820 Oct. 24, 2000.

* cited by examiner

METHOD FOR FACILITATING FORWARDING OF DATA PACKETS THROUGH A NODE OF A DATA TRANSFER NETWORK USING MULTIPLE TYPES OF FORWARDING TABLES

CROSS-REFERENCE TO RELATED APPLICATION

This application is a continuation of co-pending U.S. patent application Ser. No. 10/737,989, filed Dec. 17, 2003, and published Jul. 7, 2005 as U.S. Patent Publication No. US/2005-0149600 A1, entitled "Method, System and Program Product for Facilitating Forwarding of Data Packets Through a Node of a Data Transfer Network Using Multiple Types of Forwarding Tables", by Herring et al.; and which is also related to co-pending U.S. patent application Ser. No. 11/766,475, filed Jun. 21, 2007, entitled "System and Program Product for Facilitating Forwarding of Data Packets Through a Node of a Data Transfer Network Using Multiple Types of Forwarding Tables", by Herring et al., the entirety of which is hereby incorporated herein by reference.

TECHNICAL FIELD

This invention relates in general to data packet processing at a network switching node, and more particularly, to techniques for facilitating packet processing by providing multiple types of forwarding tables at a network switching node and a selection mechanism for a selecting a particular forwarding table of the multiple types of tables based on an attribute associated with a received data packet.

BACKGROUND OF THE INVENTION

Switches or switching nodes interconnect end nodes of a data communications (or transfer) network and forward data packets between the end nodes. Switches are transparent to the end nodes and generally are not directly addressed. Instead, packets are addressed to their ultimate destination in a network using a local destination address. For one class of switches, every destination port within a network of switches is configured with one or more unique local destination addresses to provide this functionality. From the point of view of a switch, a local destination address represents a path through the switch from one of its input ports to an output port. A switching node is conventionally configured with a single forwarding table. Individual packets are forwarded through a switch to an output port or output ports based on the packet's local destination address field and the switch's forwarding table.

SUMMARY OF THE INVENTION

Applicants recognize herein that a reduction in the size of memory required for a switching node's forwarding table is possible if forwarding tables of different types are provided and used to map received data packets addressed to downstream nodes and upstream nodes to appropriate output ports of the switching node.

Thus, the shortcomings of the prior art are overcome and additional advantages are provided through the provision of a method of packet processing for a node of a data transfer network wherein the node has a plurality of types of forwarding tables. The method includes receiving a data packet at the node and selecting a forwarding table from the multiple types of forwarding tables based on an attribute associated with the received data packet. The forwarding table selected is then employed by the node to map the received data packet to an output port of the node.

Further aspects of the method of the present invention include configuring a node of a data transfer network by providing a plurality of types of forwarding tables, selection logic for selecting one of the provided types of forwarding tables for a data packet received by the node, and mapping logic for mapping a received data packet to an output port of the node. The mapping logic utilizes the selected forwarding table in mapping the received data packet to an output port of the node.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Generally stated, provided herein is a packet processing technique for a node of a data transfer network. Pursuant to the technique, the node is provided with a plurality of types of forwarding tables. The technique includes receiving a data packet at the node and selecting a forwarding table from the multiple types of forwarding tables based on an attribute associated with the received data packet. The received data packet is then mapped to an output port of the node using the selected forwarding table.

Figure 1:
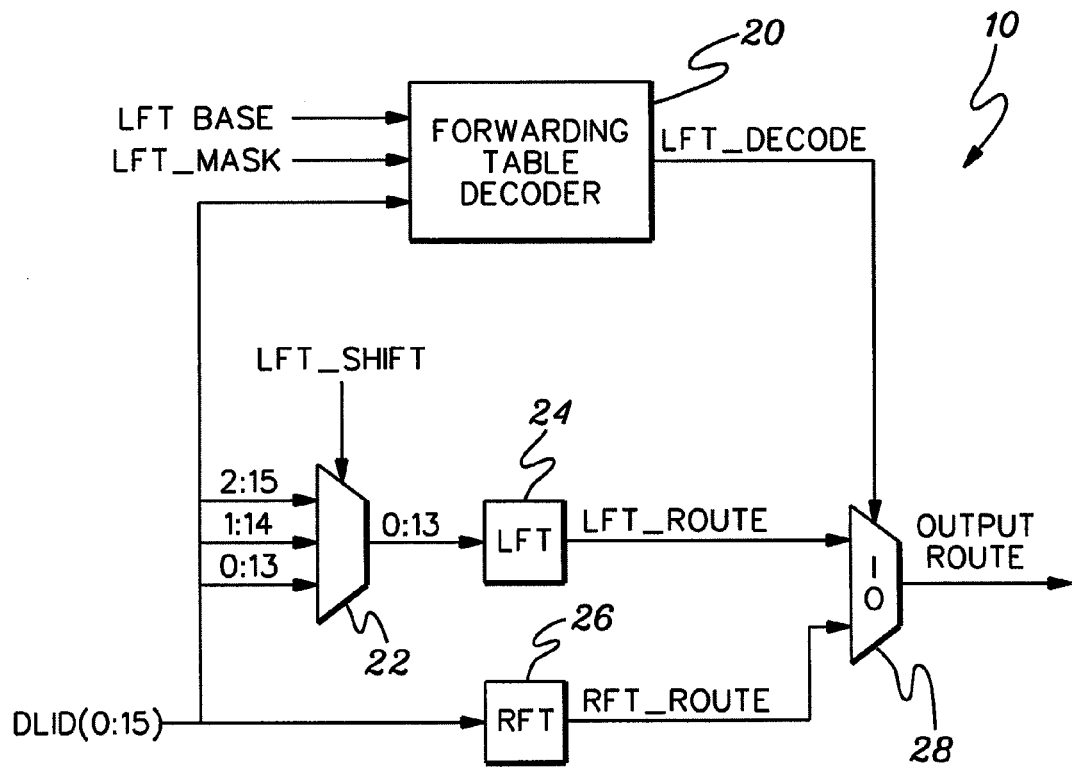
FIG. 1 illustrates one embodiment of packet processing logic for a node of data transfer network, in accordance with an aspect of the present invention.

One embodiment of packet processing logic for a node of a data transfer network, in accordance with one or more aspects of the present invention, is illustrated in FIG. 1. An attribute associated with a received data packet, e.g. a destination address or destination local identification (DLID), is provided as an input to forwarding table decoder logic 20. The value of the received data packet's attribute is used by forwarding table decoder 20 as a basis for selecting one of the types of forwarding tables associated with or accessible by the node, e.g., a linear forwarding table 24 and a random forwarding table 26, which is then used to map the received data packet to an output port of the node.

As illustrated in FIG. 1, two parameters, LFT_BASE and LFT_MASK can be defined and provided to forwarding table decoder 20. The parameters LFT_BASE and LFT_MASK are used by forwarding table decoder 20 to define a portion of the attribute space for which linear forwarding table 24 is to be selected for mapping the received data packet to an output port. In one embodiment, forwarding table decoder logic 20 can be described by the following pseudo-code.

```
if ((DLID xnor LFT_BASE) or LFT_MASK) == (all ones) then
    Use Linear Forwarding
else
    Use Random Forwarding
```

The output of forwarding table decoder logic 20 (LFT_DE-CODE) is used as a selection control signal to a multiplexer 28 to select either the output of linear forwarding table 24 or the output of random forwarding table 26 for use in mapping the received data packet to an output port.

In this embodiment, when the value of an attribute of the received packet falls within the portion of an attribute-value space defined by LFT_BASE and LFT_MASK, multiplexer 22 applies a transformation to the attribute of the received data packet. Parameter LFT_SHIFT is applied as a selection control input to multiplexer 22 to define the transformation. In this example, the transformation of the attribute value involves selecting only fourteen of the sixteen bits comprising the destination address. The parameter LFT_SHIFT determines whether bits 0 to 13, 1 to 14, or 2 to 15 are selected where the value of LFT_SHIFT equals 0, 1, or 2, respectively. The transformed attribute value output of multiplexer 22 is then used as an index to linear forwarding table 24 to determine the output to which to map the received data packet. Linear forwarding table 24 comprises a list of port indices addressed by the transformed attribute values in one example.

In this example, transforming the attribute value by ignoring two of the bits comprising the destination address of a packet has the effect of mapping four ($2^2$) destination addresses to the same the same linear forwarding table index. Advantageously, the transformation results in a reduction in the number of port indices that are required to be stored in the linear forwarding table by a factor of four.

When the value of the attribute of the received packet falls outside of the portion of the attribute-value space defined by LFT_BASE and LFT_MASK, random forwarding table 26 is selected for use in mapping the received data packet to an output port of the node. In one example, random forwarding table 26 comprises a list of destination addresses and their corresponding output port indices.

Figure 2:
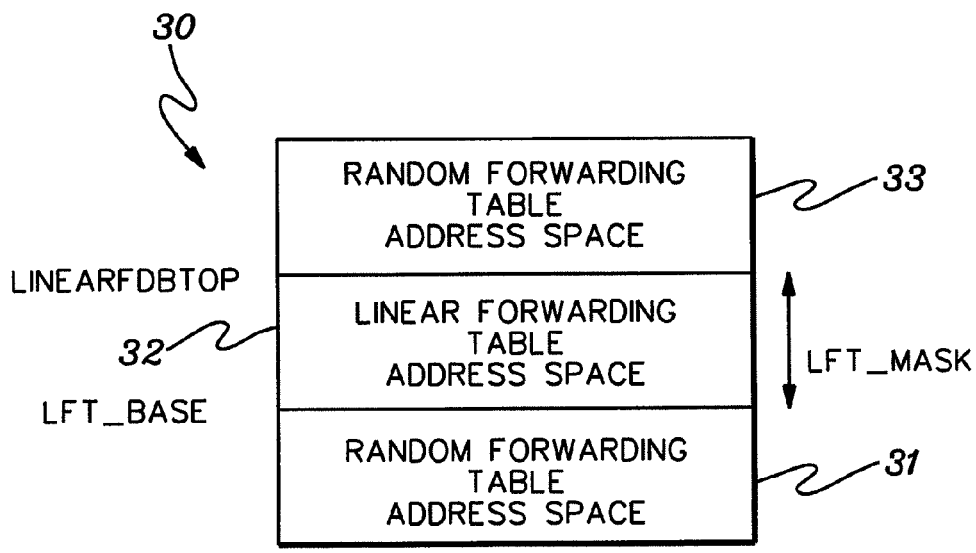
FIG. 2 illustrates one example of memory associated with the pocket processing logic of FIG. 1 showing locating both the linear forwarding table and the random forwarding table within a single forwarding-table memory space, in accordance with an aspect of the present invention.

FIG. 2 illustrates one example of partitioning an attribute-value space 30 of a node's memory into linear forwarding table address space 32 and a non-contiguous random forwarding table address space comprising random forwarding table address space region 31 and random forwarding table address space region 33. In this example, the parameter LFT_BASE indicates the first address in linear forwarding table address space 32, and the parameter LFT_MASK defines the "width" of linear forwarding table address space 32, i.e. the number of contiguous destination addresses comprising linear forwarding table address space 32. The logical expression presented in the if-statement of the pseudo-code set forth above describes how the parameters LFT_BASE and LFT_MASK define linear forwarding table space 32 in attribute-value space 30. By utilizing appropriate values of LFT_BASE and LFT_MASK, linear forwarding table address space 32 can be placed anywhere in attribute-value space 30 and be of a desired width. The parameter LINEARFDBTOP is provided to mark a first address of any unused portion at the top of linear forwarding table address space 32.

Figure 3:
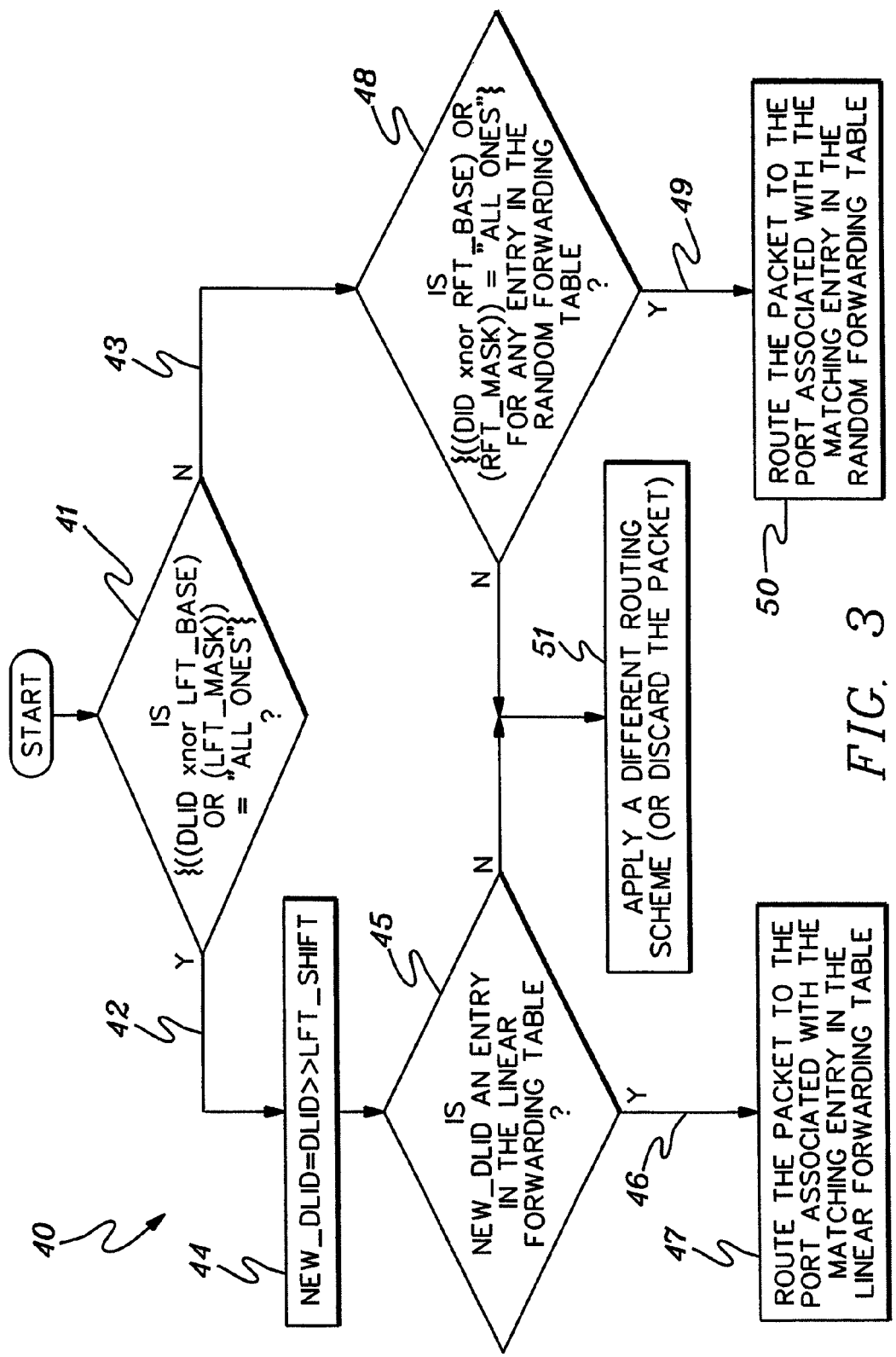
FIG. 3 is a flowchart of one embodiment of packet processing for a node of a data transfer network, in accordance with an aspect of the present invention.

One embodiment of a packet processing technique for a node of a data transfer network in accordance with one or more aspects of the present invention is described below with reference to flowchart 40 of FIG. 3. Initially, a logical function 41, which is applied to an attribute of a received data packet, essentially determines whether the value of the attribute of the received data packet is within the space of attribute values assigned to the linear forwarding table. In the example of FIG. 3, the data packet attribute utilized is its destination address (DLID).

If the data packet's destination address falls within the linear forwarding table address space, the processing proceeds along branch 42, where the destination address is transformed into a linear forwarding table index by selecting a subset of the bits comprising the destination address 44. The subset selected is controlled by the parameter LFT_SHIFT. That is, the transformation comprises shifting the destination address LFT_SHIFT bits to the right in a register so that the destination address is truncated by deleting the number of least significant bits specified by the parameter LFT_SHIFT.

The resulting linear forwarding table index is tested 45 to determine whether it corresponds to one of the destination addresses assigned to the linear forwarding table or to one of the destination addresses assigned to a default mapping rule. If the resulting linear forwarding table index corresponds to a destination address assigned to the linear forwarding table, branch 46 is taken, and the received packet is mapped 47 to the port that is addressed in the linear forwarding by the linear forwarding table index.

If the data packet's destination address does not fall within the linear forwarding table address space, then processing proceeds along branch 43 to determine whether the packet's destination address is assigned to the random forwarding table or to a default mapping rule. If the destination address is an entry in the random forwarding table, branch 49 is taken, and the received packet is mapped 50 to the port that is indicated by an entry in the random forwarding table associated with the destination address entry in the random forwarding table.

In one embodiment, one or more destination addresses can be represented in a random forwarding table by two parameters, RFT_BASE and RFT_MASK, and, consequently, each row of the random forwarding table comprises three entries—an RFT_BASE value, an RFT_MASK value, and a corresponding port index. Condition statement 48 determines whether a received packet's destination address matches one of the destination addresses represented by an RFT_BASE, RFT_MASK pair. As illustrated in FIG. 3, statement 48 comprises computing the logical exclusive-NOR of the destination address of the received packet and RFT_BASE and computing the logical OR of the result with RFT_MASK.

If branch 46 is not taken from inquiry 45, or branch 49 is not taken from inquiry 48, then the received data packet is mapped 51 to an output port according to a routing scheme other than the mapping defined by the linear forwarding table or the mapping defined by the random forwarding table. In one example, the processing of statement 51 could comprise mapping the received data packet to a default port. In another example, the received data packet could simply be discarded.

In another embodiment, the random forwarding table could be replaced by a content addressable memory (CAM) forwarding table. The CAM forwarding table comprises two columns with each row comprising, for example, a destination address entry in one column and a corresponding port index in the other column. Condition statement 48 in this embodiment would comprise determining whether a packet's destination address matches one of the destination address entries in the CAM forwarding table.

Figure 4:
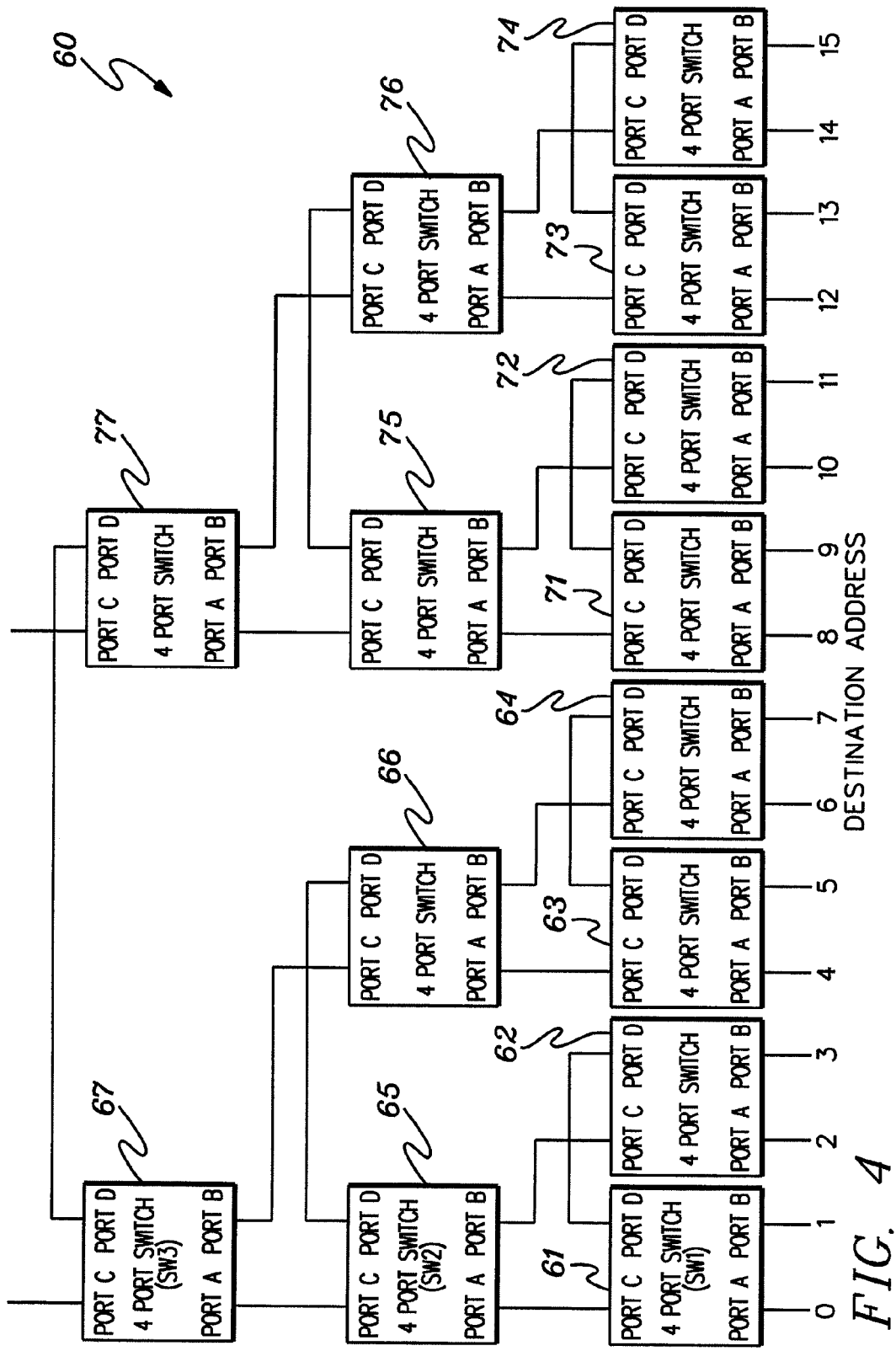
FIG. 4 illustrates one example of a data transfer network environment utilizing data packet node processing, in accordance with an aspect of the present invention.

FIG. 4 illustrates one example of a data transfer network environment 60 comprising a plurality of switching nodes which utilize a technique of packet processing, in accordance with an aspect of the present invention. In this example, network environment 60 comprises a plurality of 4-port switches, 61 through 67 and 71 through 77, that are connected in a hierarchical fashion. Switches 61, 62, 63, 64, 71, 72, 73, and 74 comprise a first level of switching devices in network environment 60 and are connected to endnodes (0-15) via ports A and B. Switches 65, 66, 75, and 76 comprise a second level of the network hierarchy, and switches 67 and 77 comprise a third level of the network hierarchy. In this example, each switch interfaces to nodes in a lower level of network environment 60 via ports A and B; each switch interfaces to another switch in the same level of the network hierarchy via port D; and each switch interfaces to a switch in a higher level of the network hierarchy via port C.

In the example of FIG. 4, 4-port switches 61 through 67 and 71 through 77 advantageously utilize a technique of packet processing in accordance with an aspect of the present invention, wherein packets received by a switch addressed to downlink nodes are mapped to output ports by the switch's linear forwarding table. Packets received by a switch that are not addressed to downlink nodes are mapped to output ports using the switch's random forwarding table. Table 1 shown below presents exemplary linear and random forwarding tables (LFT and RFT) for 4-port switch SW1 61, 4-port switch SW2 65 and 4-port switch SW3 67 for network environment 60.

TABLE 1

Routing using Only Hybrid Routing (One possible solution)

SW1: 2 entry LFT, 1 entry RFT

| LFT_BASE | 0x0000 | | | |
|---|---|---|---|---|
| LFT_MASK | 0x0001 | | (0, 1 → LFT, else RFT) | |
| LFT: | LID | 0 | | 1 |
| | Port | A | | B |

| RFT_BASE | RFT_MASK | Port | | |
|---|---|---|---|---|
| 0x0002 | 0x0001 | D | | |
| Default | | C | | |

TABLE 1-continued

Routing using Only Hybrid Routing (One possible solution)

SW2: 4 entry LFT, 1 entry RFT

| LFT_BASE | 0x0000 | | | | |
|---|---|---|---|---|---|
| LFT_MASK | 0x0003 | | 0-3 → LFT, else RFT | | |
| LFT: | LID | 0 | 1 | 2 | 3 |
| | Port | A | A | B | B |

| RFT_BASE | RFT_MASK | Port |
|---|---|---|
| 0x0004 | 0x0003 | D |
| Default | | C |

SW3: 8 entry LFT, 1 entry RFT

| LFT_BASE | 0x0000 | | | | | | | | |
|---|---|---|---|---|---|---|---|---|---|
| LFT_MASK | 0x0007 | | (0-7 → LFT, else RFT) | | | | | | |
| LFT: | LID | 0 | 1 | 2 | 3 | 4 | 5 | 6 | 7 |
| | Port | A | A | A | A | B | B | B | B |

| RFT_BASE | RFT_MASK | Port |
|---|---|---|
| 0x0008 | 0x0007 | D |
| Default | | C |

For purposes of comparison, Table 2 shown below presents exemplary linear forwarding tables for 4-port switch SW1 61, 4-port switch SW2 65 and 4-port switch SW3 67 for network environment 60 for an example in which the switches have only linear forwarding tables. Table 3 shown below presents exemplary random forwarding tables for 4-port switch SW1 61, 4-port switch SW2 65 and 4-port switch SW3 67 for network environment 60 for an example in which the switches have only random forwarding tables. From a comparison of the sizes of the linear forwarding tables presented in Tables 1 and 2, it is apparent that use of a technique of packet processing in accordance with the present invention facilitates a reduction in the size of the linear forwarding table required in switching nodes at each level of network environment 60. Similarly, it is apparent that use of this technique also facilitates a reduction in the size of the random forwarding table required in switching nodes at each level of network environment 60 from a comparison of the sizes of the random forwarding tables presented in Tables 1 and 3. Although a packet processing technique utilizing both linear and random forwarding tables requires two forwarding tables, the total memory required is less than if only one type of forwarding table is provided in the switching node.

TABLE 2

Routing Using Only Linear Forwarding Tables

SW1 - (need 4 entries)

| LID | 0 | 1 | 2 | 3 | else |
|---|---|---|---|---|---|
| Port | A | B | D | D | C |

SW2 - (need 8 entries)

| LID | 0 | 1 | 2 | 3 | 4 | 5 | 6 | 7 | else |
|---|---|---|---|---|---|---|---|---|---|
| Port | A | A | B | B | D | D | D | D | C |

SW3 - (need 16 entries)

| LID | 0 | 1 | 2 | 3 | 4 | 5 | 6 | 7 | 8 | 9 | 10 | 11 | 12 | 13 | 14 | 15 | else |
|---|---|---|---|---|---|---|---|---|---|---|---|---|---|---|---|---|---|
| Port | A | A | A | A | B | B | B | B | D | D | D | D | D | D | D | D | C |

TABLE 3

Routing Using Only Random Forwarding Tables

| RFT_BASE | RFT_MASK | PORT | Comments |
|---|---|---|---|
| SW1 - Need 3 entries | | | |
| 0x0000 | 0x0000 | A | 0 → A |
| 0x0001 | 0x0000 | B | 1 → B |
| 0x0002 | 0x0001 | D | 2-3 → D |
| Default | | C | |
| SW2 - Need 3 entries | | | |
| 0x0000 | 0x0001 | A | 0-1 → A |
| 0x0002 | 0x0001 | B | 2-3 → B |
| 0x0004 | 0x0003 | D | 4-7 → D |
| Default | | C | |
| SW3 - Need 3 entries | | | |
| 0x0000 | 0x0003 | A | 0-3 → A |
| 0x0004 | 0x0003 | B | 4-7 → B |
| 0x0008 | 0x0007 | D | 8-15 → D |
| Default | | C | |

An example of a data transfer network switching environment wherein the technique of the present invention may be advantageously utilized is a switching node that is an enhancement of the Infiniband™ architecture standard. In this environment, a packet processing technique and system in accordance with the present invention can be utilized to extend a switching node's unicast routing capabilities by dynamically using both linear and random forwarding tables to map received data packets to the switching node's output ports. Unicast routing maps a received data packet to one output port of a switching node. The Infiniband™ specification requires unicast routing when the destination address of the data packet is greater than 0 and less than 0xC000.

The present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A packet processing method for a node of a data transfer network, said method comprising:
   receiving a data packet at a node of the data transfer network;
   selecting a forwarding table from a plurality of types of forwarding tables, said selecting being based on an attribute associated with the data packet and including determining whether a value of the attribute falls within a defined range of attribute values, the defined range of attribute values being defined by at least one changeable value-range parameter, and applying a transformation to the value of the attribute, the transformation mapping a plurality of values of the attribute to a table index value, wherein the plurality of values of the attribute are assigned to a same port and wherein the transformation is defined by a changeable value-transformation parameter;
   mapping the data packet to an output port of the node, said mapping utilizing the forwarding table selected by said selecting; and
   wherein the plurality of types of forwarding tables comprises the linear forwarding table and the random forwarding table, and wherein the linear forwarding table is located in a memory space by a linear-forwarding-table base address and a linear-forwarding-table mask, and a remaining portion of the memory space is assigned to the random forwarding table.

2. The method of claim 1, wherein the plurality of types of forwarding tables further comprises a content-addressable memory forwarding table.

3. The method of claim 1, wherein the attribute comprises a destination address of the received data packet.

4. A method of configuring a node of a data transfer network comprising:
   providing a plurality of types of forwarding tables, the forwarding tables being used in mapping received data packets to output ports of the node;
   dynamically selecting, by selection logic, a forwarding table from the plurality of types of forwarding tables for a data packet received by the node, the selection logic utilizing an attribute associated with the data packet in the selecting;
   mapping, by mapping logic, the received data packet to an output port of the node, the mapping utilizing the forwarding table dynamically selected by the selection logic for the received data packet;
   wherein the plurality of types of forwarding tables include a linear forwarding table and the mapping logic further comprises attribute-transformation logic, the attribute-transformation logic mapping a plurality of attribute values of received data packets to a linear forwarding table index of the linear forwarding table, thereby reducing required entries in the linear forwarding table; and
   wherein the plurality of types of forwarding tables comprises the linear forwarding table and the random forwarding table, and wherein the linear forwarding table is located in a memory space by a linear-forwarding-table base address and a linear-forwarding-table mask, and a remaining portion of the memory space is assigned to the random forwarding table.

5. The method of claim 4, wherein the plurality of types of forwarding tables further comprises a content-addressable memory forwarding table.

6. The method of claim 4, wherein the method further comprises providing at least one changeable selection parameter used by the selection logic for selecting a forwarding table.

7. The method of claim 4, wherein the mapping logic further comprises a changeable attribute-transformation parameter, the changeable attribute-transformation parameter being employed in the mapping of the plurality of attribute values.

8. The method of claim 7, wherein the attribute-transformation logic comprises logic for discarding a number of bits indicated by the attribute-transformation parameter from the plurality of attribute values.

* * * * *